(12) United States Patent
Sæthre et al.

(10) Patent No.: US 6,441,085 B1
(45) Date of Patent: Aug. 27, 2002

(54) PVC MIXTURE AND METHOD FOR ITS PRODUCTION

(75) Inventors: Bård Sæthre, Porsgrunn; Steinar Pedersen, Skien, both of (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/462,886

(22) PCT Filed: Jul. 8, 1998

(86) PCT No.: PCT/NO98/00206

§ 371 (c)(1),
(2), (4) Date: Apr. 18, 2000

(87) PCT Pub. No.: WO99/03912

PCT Pub. Date: Jan. 28, 1999

(30) Foreign Application Priority Data

Jul. 18, 1997 (NO) ................................................ 973351

(51) Int. Cl.⁷ ............................................... C08L 27/00
(52) U.S. Cl. ........................................ 524/527; 523/223
(58) Field of Search ........................... 524/527; 523/223

(56) References Cited

U.S. PATENT DOCUMENTS 4,171,428 A 10/1979 Kuhn .......................... 528/502

FOREIGN PATENT DOCUMENTS

| DE | 210697 | 6/1984 |
| GB | 1410202 | 10/1975 |
| JP | 7-53627 | 2/1995 |

*Primary Examiner*—Peter D. Mulcahy
(74) *Attorney, Agent, or Firm*—Wenderoth, Lind & Ponack, L.L.P.

(57) ABSTRACT

A PVC mixture which can be converted into plastisol, prepared by a process with comprises mixing a dispersion of spherical and compact PVC particles with a narrow size distribution (CV 0–25%) in the range 10 to 50 micrometers, with a PVC latex produced by standard emulsion-, dispersion-, miniemulsion-, microsuspension-, or seed-polymerisation in such a way that the PVC particles are homegeneously dispersed without agglomeration in the aqueous phase, and processing the resulting dispersion into a free flowing dry powder.

13 Claims, No Drawings

PVC MIXTURE AND METHOD FOR ITS PRODUCTION

This is a 371 application of PCT/NO98/00206 filed Jul. 8, 1998.

Paste PVC is a type of polyvinyl chloride which is processed in liquid form as plastisols or pastes. This segment accounts for approximately 10% of total PVC consumption, which is more than 5 million tonnes per annum in Western Europe. Plastisols are processed by coating (reverse roll-coating, knife coating, screen coating), gravure printing and screen printing, rotational casting and dipping. Common products are flooring, wallpaper, tarpaulins, roofing materials, rainwear, panelling and gloves. Both compact and foamed articles can be produced.

Various production processes for paste PVC are known. Both continuous and discontinuous methods can be used. All the methods are based on techniques known from emulsion polymerisation technology. Norwegian patent application no. 844819 (Chemische Werke Hüls AG) discusses the advantages and disadvantages of the various techniques and references to current patent specifications are given.

As Norwegian patent application no. 844819 states, the advantage of discontinuous polymerisation is that relatively low emulsifier quantities can be used. However, a disadvantage is that the plastisols which can be produced from these polymers have a higher viscosity and they are also usually dilatant pastes, which restricts their area of application.

An attempt is made to solve the problem with dilatant pastes in the Norwegian patent by dosing part of the emulsifier solution at a later stage during the polymerisation instead of using the entire quantity of emulsifier from the start. Another technique used commercially is so-called seed polymerisation for the production of bimodal latexes. This is discussed in detail by M. J. Bunten in the Encyclopedia of Polymer Science and Engineering; Vinyl Chloride Polymers, Polymerization, $2^{nd}$ ed., Vol. 17, page 329–376, 1989.

To achieve low viscosities in PVC plastisols, it is an advantage to have large particles. This gives reduced particle surface area for the plasticiser to cover in addition to fewer particles and thus less effect from particle-particle interaction occurs. However, another effect, the effective volume fraction, is the most important factor which determines viscosity. By preparing a particle size distribution which gives maximum packing of the particles, the effective volume fraction of the particles can be minimized. Optimal packing of the particles can also be retained even if the shear rate is increased, making it possible to produce plastisols with Newtonian flow.

The traditional emulsion polymerisation process contains a major restriction regarding the preparation of large particles and the particle size is usually limited to approximately 1 micrometer. Using the so-called microsuspension technique, in which the monomer is finely distributed by mechanical homogenisation, it is possible to produce particles up to 3 to 5 micrometers. However, this process usually produces a majority of particles which are not spherical and have different shapes. Together with an unfavourable particle distribution, this leads to the known dilatant flow behaviour of plastisols from such products. An attempt is made to solve this problem by producing plastisols as a mixture of paste PVC powder and extender PVC. Extender PVC consists of particles produced by suspension polymerisation and often has particles between 35 and 60 micrometers. However, it also often contains larger particles, which limits the film thickness which the products can have. Extender PVC particles produced from suspension polymerisation will have a non-spherical form, which again produces an increase in particle surface area.

The present invention provides a method for producing paste PVC products and a PVC mixture with a very special particle size distribution. Plastisols produced from these products are distinguished by particularly low viscosity in connection with both low and high shear rates. The products also have a reduced quantity of emulsifier from the emulsion polymerisation, thus reducing the disadvantages caused by the emulsifier in the finished products. It is also unnecessary to use extender, which means that the products are also suitable for thinner films and the plastisols can be produced from only one PVC product. Particularly suitable areas of application are for roofing materials and wallpapers.

The procedure for producing paste PVC products suitable for the stated plastisol processes involves polymerisation of vinyl chloride or mixtures of vinyl chloride with up to 30 per cent weight copolymerisable monomers by discontinuous polymerisation in the presence of water-soluble or monomer-soluble polymerisation initiators and a predispersion produced either from a mixture of emulsifier and a fatty alcohol with 12–20 carbon atoms, emulsifier can be an alkali salt or ammonium salt of a branched or straight-chained fatty acid with 12 to 18 carbon atoms, or an alkyl sulphonic acid, or an alkyl aryl sulphonic acid or a sulphosuccinate ester, characterised in that this mixture is heated to over the melting point of the fatty alcohol before it enters the presence of the monomer, or a finely distributed emulsion of a totally water-insoluble compound produced by mechanical homogenisation of a mixture of water, emulsifier and water-insoluble compound, in such a way that a polymer latex is produced which consists of particles with a relatively narrow size distribution, with mean diameter around 1 micrometer, and that this latex is mixed, in a subsequent stage, with a polymer dispersion of spherical PVC particles with a very narrow size distribution, mostly between 10 and 50 micrometers, produced, for example, according to the method described in Norwegian patent application no. 961625, and that this mixture, which can have any quantity ratio between the two polymer types, is processed into a dry powder which can be used in PVC mixtures for plastisols for use according to conventional processing techniques for paste PVC. It is particularly advantageous for the polymer dispersion which is mixed with the latex to consist of spherical particles which have a very narrow size distribution, but this is not absolutely necessary.

Surprisingly enough, it turned out that the mixture of the two polymer dispersions was mechanically stable so that it could be agitated, transported by pumping and spray-dried without coagulation problems. Spray-drying by means of rotary disc or nozzle atomisation is a common method of drying paste PVC. It was also surprising that the resulting powder product (PVC-resin) could be dispersed in the plasticiser to form a plastisol without large aggregates of particles, which would have limited the applicability of the plastisol.

PVC latexes with a particle size in the region of 1 micrometer can also be produced by other known techniques such as emulsion polymerisation, seed polymerisation and microsuspension polymerisation. In the examples which follow later, it is possible to see the enormous improvement achieved when the particle distribution is changed from monomodal, mostly around 1 micrometer, to bidisperse, mostly 0.2 and 1 micrometer, to bidisperse with 1 micrometer and 20 micrometers. Examples of tridisperse particle distributions are also shown.

The procedure shown avoids many of the disadvantages of the existing paste PVC products. The paste viscosity is one of the most important properties and is essential for the use of the plastisol in the various processing processes. It is known that the viscosity drops as the particle size increases and that it is advantageous to have a mixture of large and small particles. Together, this produces the maximum packing of the particles in the plastisol and smallest total particle surface possible so that as much of the plasticiser as possible can contribute to producing flow. By using a considerable proportion of particles with a size between 10 and 30 micrometers, a much larger average diameter is produced than can be achieved by only using particles produced by emulsion polymerisation. A very powerful effect is also achieved by mixing particles with a diameter of approximately 1 micrometer with particles with a diameter of over 10 micrometers. By means of seed polymerisation or by mixing two populations which are produced by means of standard emulsion polymerisation, particles are produced which are smaller than 1 micrometer. This produces a much larger particle surface and a greatly increased number of particles.

An even more preferred mixture of polymer latexes can be achieved if the size of the smallest particle population is increased to between 2 and 10 micrometers. By using a procedure as stated in Norwegian patent application no. 960718, latex with the smallest particles can easily be given a mean particle diameter between 2 and 10 micrometers. This makes it possible to achieve advantages both by having large particles, which produces a small overall particle surface area, and a small number of particles, which results in less particle-particle interactions, and still retaining a relatively large, favourable interval between the particle diameters of the two populations which are mixed. An optimal degree of packing of the particles is achieved when the size ratio between the small and large particles exceeds 10 according to R. D. Sudduth (J. of Applied Polymer Science, 48, 37–55 (1993)).

The water absorption in PVC films or membranes produced is determined largely by the content of anionic emulsifier and other salts added during the production process. By using a proportion of particles between 10 and 50 micrometers, the total quantity of emulsifier in relation to the quantity of PVC is reduced because these particles use polymeric stabilizers without ionic groups in the molecules. This means that the stated procedure is also advantageous regarding the production of products with low water absorption. Particular advantages are achieved if the particle fraction with the smallest diameter is between 2 and 10 micrometers because then it is possible to dewater the polymer dispersion by means of filtration or other mechanical separation, which also makes it possible to wash the particles so that the finished mixture is as free as possible from water-soluble ionic compounds.

The stated production methods for polymer latex are particularly preferred but it is also possible, in the present invention, to use other techniques such as standard emulsion polymerisation, seed polymerisation, continuous emulsion polymerisation, microsuspension polymerisation and other combinations of these techniques. It is also preferable for the polymerisation of the polymer latex to be complete and continued to the desired degree of conversion before the polymer latex is mixed with the polymer dispersion with the larger particles. This is done to be absolutely sure that two distinct particle populations are retained and to limit the possibilities of coagulation and precipitation of small particles on the surface of the large particles. There are no restrictions regarding the mixing process itself, but it is greatly advantageous for it to take place by continuous agitation so as to avoid sedimentation and inhomogeneity.

When plastic films are to be used as the top layer, the surface gloss is an important parameter. The examples show that when the quantity of large particles mixed in increases in excess of 20 % weight, the gloss is reduced and a certain matting effect occurs. Then it is unnecessary to add external matting agents to the plastisol formulations.

The present invention will be described in further detail in the following examples. Large particles with a narrow size distribution with a coefficient of variation of less than 25%, have been used in these examples. However, this is not necessary for the invention as it is defined in the claims.

A. Production of Polymer Latex and Polymer Dispersion

A1. Predispersion with Mixture of Emulsifier and Fatty Alcohol.

Water (2,000.00 g) was heated to 50° C. and sodium cetyl sulphate (15.75 g) and fatty alcohol with 16–18 carbon atoms (23.68 g) were added. The solution was heated further to 80° C. and kept at this temperature for 20 minutes before being cooled to 50° C. This predispersion was added to a 10-litre polymerisation reactor with an agitator together with copper sulphate pentahydrate (0.117 g/l, 6.43 ml) and more water (to a total quantity of 3,940 g). The reactor was pressure-tested with nitrogen and evacuated to remove all oxygen before the addition of vinyl chloride (2,498 g). The content of the reactor was heated to 53° C. and at that temperature hydrogen peroxide (4.8%, 16.5 ml) and ammonia (1 M, 16.5 ml) were added. The reaction took place at constant temperature until a pressure drop of 1 bar was observed. The polymerisation was then completed by heating the reaction mixture to 80° C. and venting off unreacted vinyl chloride. A polymer latex with 44% dry substance and a mean particle size of 0.7 $\mu$m was achieved. Sodium lauryl sulphate (0.2 phr) and fatty alcohol ethoxylate with an HLB value of 12.1 (0.2 phr) were added to the final latex.

A2. Predispersion with Emulsion of Finely Distributed Water-insoluble Component.

A mixture of two oils of aliphatic hydrocarbons with water solubility less than $10^{-3}$ g l water (100 g) was dosed into a solution of ammonium laurate (5 g) and water (195 g). This mixture was passed 5 times through a pressure homogeniser of type Manton Gaulin at a total pressure of 80 bar. A finely distributed emulsion with a mean drop diameter of 250 $\mu$m was achieved. This emulsion (100 g) was added to water (3,700 g) in connection with transfer to the 10-litre polymerisation reactor. Copper sulphate pentahydrate (0.117 g/l, 2.9 g) was added together with a seed latex of PVC particles of 65 nm (32%, 67 g), borax decahydrate (1.6 g) and an emulsifier mixture of sodium monododecyl phenoxybenzene disulphonate and sodium didodecyl phenoxybenzene disulphonate (45%, 27 g). The content of the reactor was heated to 50° C. before pressure-testing with nitrogen and evacuation to remove oxygen. Vinyl chloride (3,400 g) was added and made to diffuse into the emulsion drops for 20 minutes. Methyl ethyl ketone peroxide (10%, 35 ml) and ammonia (1 M, 55 ml) were added. The reaction took place at constant temperature until a pressure drop of 1 bar was observed. During the reaction, more emulsifier (sodium monododecyl phenoxybenzene disulphonate and sodium didodecyl phenoxybenzene disulphonate) (10%, 80 ml) was added and at 1 bar pressure drop, fatty alcohol ethoxylate with an HBL value of 12.1 (20%, 55 ml) was added. The polymerisation was completed by heating the reaction mixture to 65° C. and venting off unreacted vinyl chloride. A polymer latex with 40% dry substance and a particle size of 0.6 μm was achieved. This latex will have a bimodal particle distribution in which the smallest particles are formed from the seed latex and the largest from the predispersion.

A3. Predispersion which Produces Latex Particles Between 2 and 10 μm.

Dioctylapidate (15 g) was added to a mixture of methanol (120 g) and water (30) which contained a steric stabiliser, Hypermer C-6 (0.5 g). This solution was treated in an Ultraturax and subsequently passed 5 times through a homogeniser of type Manton Gaulin at a pressure of 400 Pa. Immediately after the homogenisation, water (300 ml) was added to the solution. More water (54.06 g), polymer stabiliser, Methocel K-100 (DOW) (0.30 g) and potassium iodide (0.038 g) were added to part of the diluted emulsion (70.6 g) and dosed into a reactor of 250 ml. Vinyl chloride (23.5 g) was added and swelled into the emulsion drops for an hour before the addition of an initiator, Wako V-59 (Wako Pure Chemical Industries Ltd.) (0.25 g), which was dissolved in methanol (0.25 g). Polymerisation took place at 60° C. for 3.5 hours. A polymer latex with an average particle size of 3.2 μm was achieved.

A4. Polymer Dispersion with PVC Particles of 22 μm.

Seed particles of PMMA of 8 μm were first produced. PVP K-30 (93.75 g) in methanol (2,636.00 g) was transferred to a 5-litre glass reactor with an agitator. The mixture was boiled under a nitrogen atmosphere for an hour before the mixture was cooled to 53° C. Methyl. methacrylate (375.00 g) was added and the reactor temperature was stabilised at 53° C. before the addition of 2,2-azobis (isobutyronitrile) (9.00 g) and methanol (585.00 9). After three hours of reaction, the temperature was increased to 60° C. over three hours and the reaction was continued until the total reaction time was 10 hours. In a next stage, PVC particles with a very narrow distribution and a particle size of 22 μm were produced. PMMA particles (100 g) were added to a 14-litre steel reactor with an agitator together with water (6,048 g), methyl hydroxypropylcellulose (10.00 g) and potassium iodide (2.47 g). The reactor was pressure-tested with nitrogen and evacuated to remove oxygen. Vinyl chloride (300 ml) was added together with 2,2-azobis(2-methyl-butyronitrile) (22.82 9) dissolved in methanol (22.82 g). The monomer and the initiator were swelled into the particles over 1 hour. The reactor temperature was then increased to 60° C. and the reaction was implemented at constant temperature. Vinyl chloride (3,190 ml) was dosed continuously during the reaction so that a constant pressure of 8.6 bar was maintained. The reaction was continued for 13 hours and 20 minutes. Then the content of the reactor was heated to 80° C. and unconverted monomer was vented off.

B. Production of PVC Mixtures which can be Converted into Plastisol

Mixtures were produced by adding polymer particles from example A4 to latexes from examples A1, A2 and A3 under continuous agitation. The resulting mixture was pumped into a pilot atomising drier (Niro Atomizer) and drying took place at temperatures $T_{in}=190°$ C. and $T_{out}=60°$ C. The speed of the atomiser wheel was 18,000 rmp and the diameter was 12.5 cm. In mixtures 11 and 12, the latexes were dehydrated by filtration before drying in a heating cabinet at 50° C. The mixture ratios were as stated in table 1 (weight proportions).

TABLE 1

PVC mixtures

| PVC type | 1 | 2 | 3 | 4 | 5 | 6 | 7 | 8 | 9 | 10 | 11 | 12 |
|---|---|---|---|---|---|---|---|---|---|---|---|---|
| A1 | 100 | 95 | 80 | 65 | 30 | — | — | — | — | — | — | — |
| A2 | — | — | — | — | — | 100 | 95 | 80 | 65 | 30 | — | — |
| A3 | — | — | — | — | — | — | — | — | — | — | 65 | 30 |
| A4 | — | 5 | 20 | 35 | 70 | — | 5 | 20 | 35 | 70 | 35 | 70 |

In all cases, a free-flowing powder was achieved which was screened in a 170-micrometer dry screen.

C. Production of Plastisols and Plastic Films from PVC Mixtures

Plastisols were produced by the PVC powder from mixture 1-12 being mixed in a Hobart mixture together with plasticiser (di-ethylhexyl-phthalate, DOP), epoxidised soyabean oil (ESO) and a thermostabiliser based on barium and zinc soaps (Lakromark LZ616). The formulations were as stated in tables C1 and C2 (phr=per hundred parts polymer). Tables C1 and C2 show the viscosity properties achieved with the formulations.

Formulation 1 is an example with only one particle population, whereas formulation 6 is produced from a latex with a bimodal distribution. Formulations 2 to 5 are thus bimodal, while formulations 7 to 10 are trimodal. The results show that the admixture of particles from latex A4 has a very great effect; it can also be seen that there is an optimal mixture ratio which produces a very low viscosity at both low and high shear rates.

TABLE C1

Mixtures of latexes A1 and A4

| Ingredients | Mixture 1 | Mixture 2 | Mixture 3 | Mixture 4 | Mixture 5 |
|---|---|---|---|---|---|
| PVC | 100 | 100 | 100 | 100 | 100 |
| DOP | 50 | 50 | 50 | 50 | 50 |
| ESO | 2 | 2 | 2 | 2 | 2 |
| LZ616 | 2 | 2 | 2 | 2 | 2 |
| Analyses | | | | | |
| Brookf. 2.5 RPM (Pas) | 9.0 | 5.6 | 3.9 | 3.1 | 10.1 |
| Brookf. 20 RPM (Pas) | 8.8 | 5.1 | 3.9 | 3.2 | 8.0 |
| Haake 400 $s^{-1}$Pas) | 22.1 | 18.7 | 8.6 | 5.8 | 6.6 |
| Gloss (%) | 47 | 50 | 30 | 20 | 10 |

TABLE C2

Mixtures of latexes A2 + A4 and A3 + A4

| Ingredients | Mixture 6 | Mixture 7 | Mixture 8 | Mixture 9 | Mixture 10 | Mixture 11 | Mixture 12 |
|---|---|---|---|---|---|---|---|
| PVC | 100 | 100 | 100 | 100 | 100 | 100 | 100 |
| DOP | 50 | 50 | 50 | 50 | 50 | 50 | 50 |
| ESO | 2 | 2 | 2 | 2 | 2 | 2 | 2 |
| LZ616 | 2 | 2 | 2 | 2 | 2 | 2 | 2 |
| Analyses | | | | | | | |
| Brookf. 2.5 RPM (Pas) | 8.1 | 6.6 | 4.0 | 3.3 | 8.8 | 6.7 | 12.3 |
| Brookf. 20 RPM (Pas) | 6.1 | 5.3 | 3.7 | 3.5 | 8.9 | 10.5 | 10.2 |

TABLE C2-continued

Mixtures of latexes A2 + A4 and A3 + A4

| Ingredients | Mixture 6 | Mixture 7 | Mixture 8 | Mixture 9 | Mixture 10 | Mixture 11 | Mixture 12 |
|---|---|---|---|---|---|---|---|
| Haake 400 s$^{-1}$Pas) | 11.8 | 9.4 | 5.5 | 4.3 | 6.0 | 15.1 | 7.3 |
| Gloss (%) | 42 | — | 55 | 40 | 31 | — | — |

What is claimed is:

1. A process for producing a PVC mixture which can be converted into plastisol, which comprises mixing a dispersion of spherical and compact PVC particles with a narrow size distribution (CV 0–25%) in the range 10 to 50 micrometers, with a PVC latex produced by standard emulsion-, dispersion-, miniemulsion-, microsuspension-, or seed-polymerisation, in such a way that the PVC particles are homogeneously dispersed without agglomeration in the aqueous phase, and processing the resulting dispersion into a free flowing dry powder.

2. A PVC mixture which can be converted into plastisol, prepared by a process with comprises mixing a dispersion of spherical and compact PVC particles with a narrow size distribution (CV 0–25%) in the range 10 to 50 micrometers, with a PVC latex produced by standard emulsion-, dispersion-, miniemulsion-, microsuspension-, or seed-polymerisation, in such a way that the PVC particles are homogeneously dispersed without agglomeration in the aqueous phase, and processing the resulting dispersion into a free flowing dry powder.

3. A plastisol prepared from a PVC mixture according to claim 2.

4. A panel prepared from the plastisol of claim 3.

5. A wallpaper prepared from the plastisol of claim 3.

6. A flooring material prepared from the plastisol of claim 3.

7. A roofing material prepared from the plastisol of claim 3.

8. A PVC mixture according to claim 2, wherein the fraction of spherical and compact particles with a narrow size distribution (CV 0–25%) and diameter in the range 10 to 50 micrometers constitutes from 1 to 35% by weight of the total quantity of PVC in the mixture.

9. APVC mixture according to claim 2, wherein the fraction of spherical and compact particles with a narrow size distribution (CV 0–25%) and diameter in the range 10 to 50 micrometers constitutes from 35 to 99% by weight of the total quantity of PVC in the mixture.

10. A PVC mixture according to claim 2, wherein the particles in the PVC latex have a mean diameter in the range of 0.2 to 2 micrometers.

11. A PVC mixture according to claim 2, wherein the particles in the PVC latex have a mean diameter in the range 2 to 10 micrometers.

12. A PVC mixture according to claim 2, wherein the particles in the PVC latex consist of a bidisperse particle distribution with a mean diameter of between 0.1 and 0.3 micrometer and 0.6 and 2 micrometers respectively.

13. A PVC mixture according to any one of claims 2 or 8–12, wherein the quantity of the spherical and compact particles with a narrow size distribution (CV 0–25% and 10–50 micrometers) represents more than 20% by weight of the total particle mixture so that it produces a matt surface in the plastic films of the final product.

* * * * *